(12) United States Patent
Childs

(10) Patent No.: US 10,040,190 B2
(45) Date of Patent: Aug. 7, 2018

(54) MANIPULATOR FOR MOVEMENT OF ARTICLES IN A CONTROLLED ENVIRONMENT CHAMBER

(71) Applicant: Montgomery William Childs, Oro Medonte (CA)

(72) Inventor: Montgomery William Childs, Oro Medonte (CA)

( * ) Notice: Subject to any disclaimer, the term of this patent is extended or adjusted under 35 U.S.C. 154(b) by 57 days.

(21) Appl. No.: 15/185,810

(22) Filed: Jun. 17, 2016

(65) Prior Publication Data

US 2016/0368153 A1    Dec. 22, 2016

Related U.S. Application Data

(60) Provisional application No. 62/181,006, filed on Jun. 17, 2015.

(51) Int. Cl.
| | |
|---|---|
| *B25J 1/08* | (2006.01) |
| *B25J 21/00* | (2006.01) |
| *B25J 17/02* | (2006.01) |
| *B01L 1/04* | (2006.01) |

(52) U.S. Cl.
CPC ............ *B25J 1/08* (2013.01); *B25J 17/0275* (2013.01); *B25J 21/005* (2013.01); *B01L 1/04* (2013.01)

(58) Field of Classification Search
CPC ......... B25J 1/08; B25J 1/10; B25J 3/04; B25J 21/00; B25J 21/005
USPC ........................................................ 414/3, 8
See application file for complete search history.

(56) References Cited

U.S. PATENT DOCUMENTS

| | | | | |
|---|---|---|---|---|
| 3,426,920 A | * | 2/1969 | Chesley | ..................... B25J 1/10 414/8 |
| 4,030,615 A | | 6/1977 | Guggi et al. | |
| 4,790,718 A | * | 12/1988 | Vickers | ............... B25J 17/0266 248/653 |
| 4,850,779 A | | 7/1989 | Cashell et al. | |
| 4,904,141 A | * | 2/1990 | Contin | ....................... B25J 1/10 414/8 |
| 5,139,383 A | * | 8/1992 | Polyak | .................... H01J 37/20 294/116 |
| 6,019,008 A | | 2/2000 | Kim et al. | |
| 8,071,892 B2 | | 12/2011 | Leegate et al. | |
| 2006/0193037 A1 | | 8/2006 | Strait | |

* cited by examiner

*Primary Examiner* — James Keenan
(74) *Attorney, Agent, or Firm* — Eugene F. Derényi; Fogler, Rubinoff LLP

(57) ABSTRACT

A movable manipulator assembly for manipulating an article in a controlled environment chamber, including a support for attaching the manipulator assembly in a gas tight manner to an entry port of a controlled environment chamber and externally with respect to the chamber, a ball joint including a central passage, sealingly seated in the support, for permitting three axis movement of the manipulator assembly while maintaining a gas seal, a manipulator arm extending from the ball joint externally with respect to the chamber, the arm including a central passage aligned with the central passage of the ball joint, the arm further including a closable entry port through which the central passage of the manipulator arm can be accessed, and a gimbaled bearing assembly connected to the manipulator arm for three axis movement of the arm.

8 Claims, 9 Drawing Sheets

MANIPULATOR FOR MOVEMENT OF ARTICLES IN A CONTROLLED ENVIRONMENT CHAMBER

BACKGROUND

The present disclosure relates in general to manipulators for the movement of articles in controlled environment chambers such as vacuum chambers and pressure chambers.

DRAWINGS

Various embodiments of the present invention will now be described with reference to the drawings, in which.

DETAILED DESCRIPTION

Figure 1:
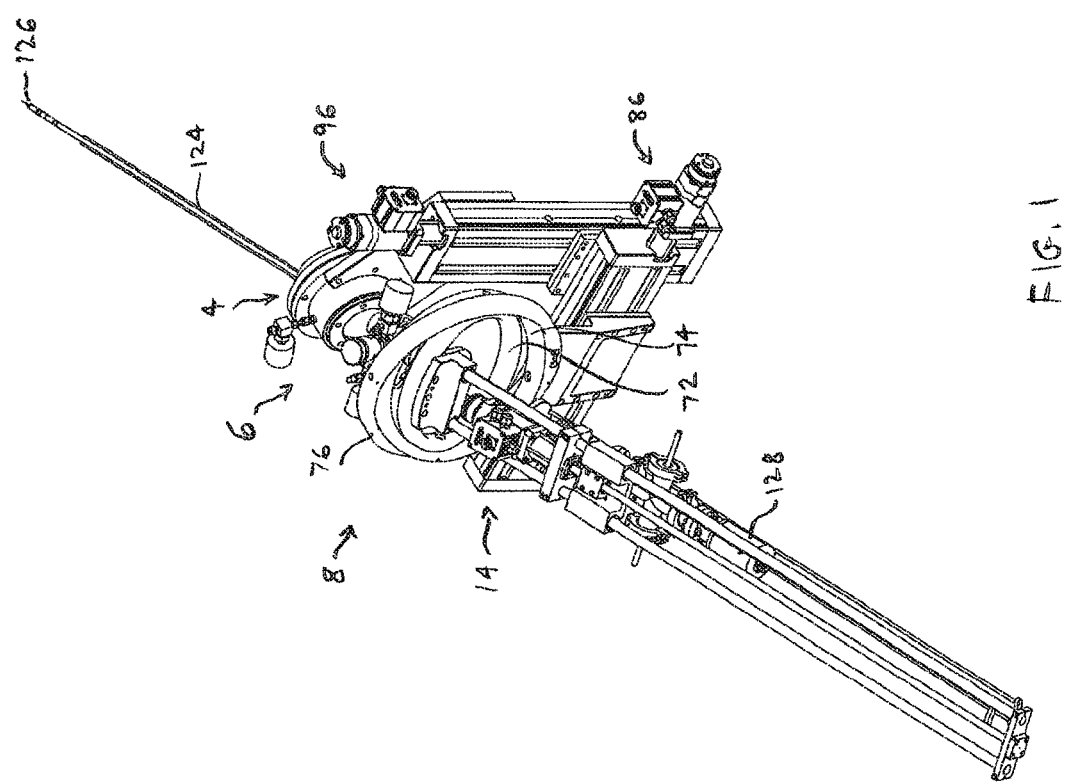
FIG. 1 is a rear perspective view, of a manipulator assembly, with the bellows retracted, according to an aspect of the present disclosure.
Figure 2:
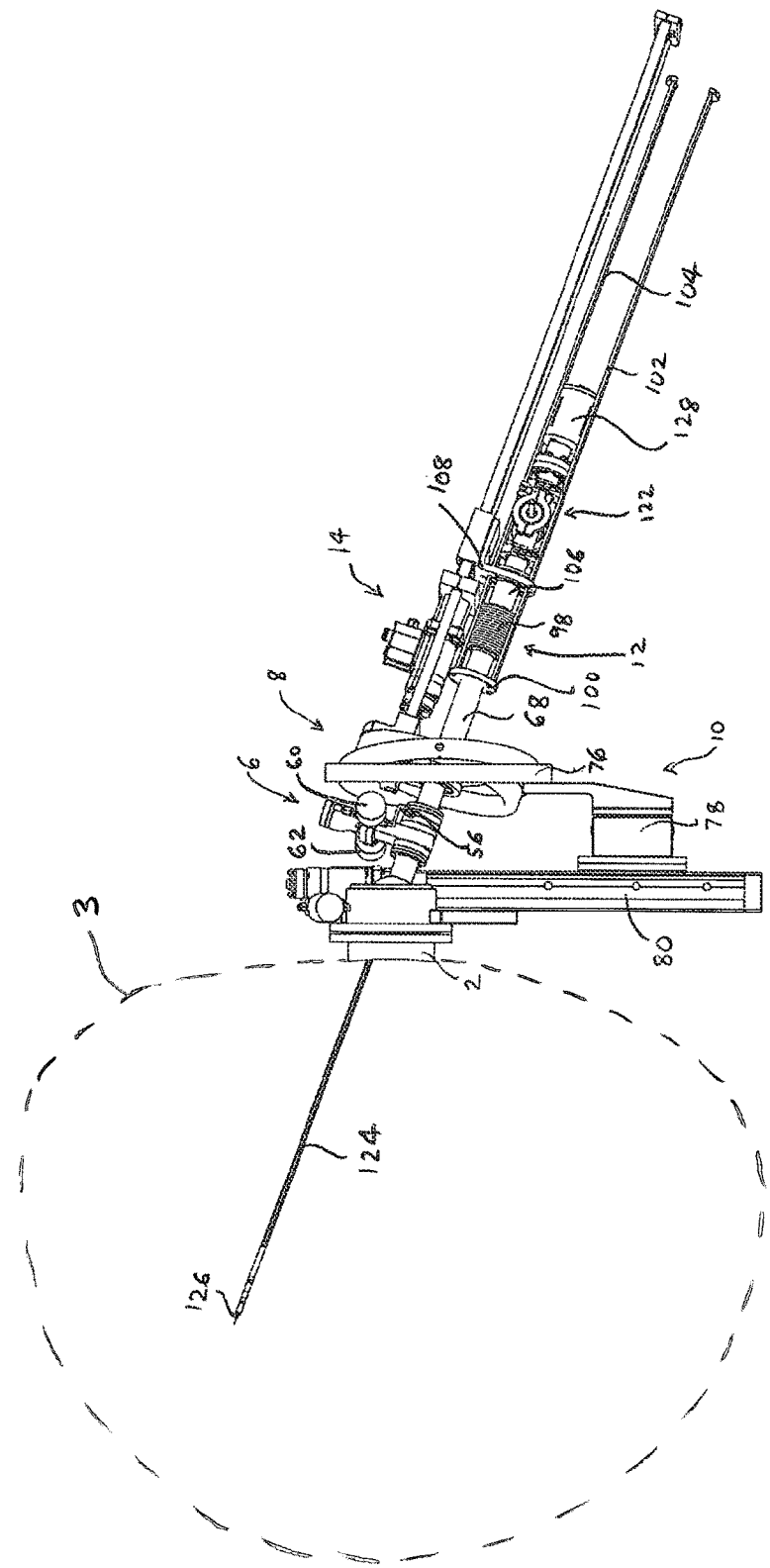
FIG. 2 is a side view, from the left side, of the manipulator assembly of FIG. 1.
Figure 3:
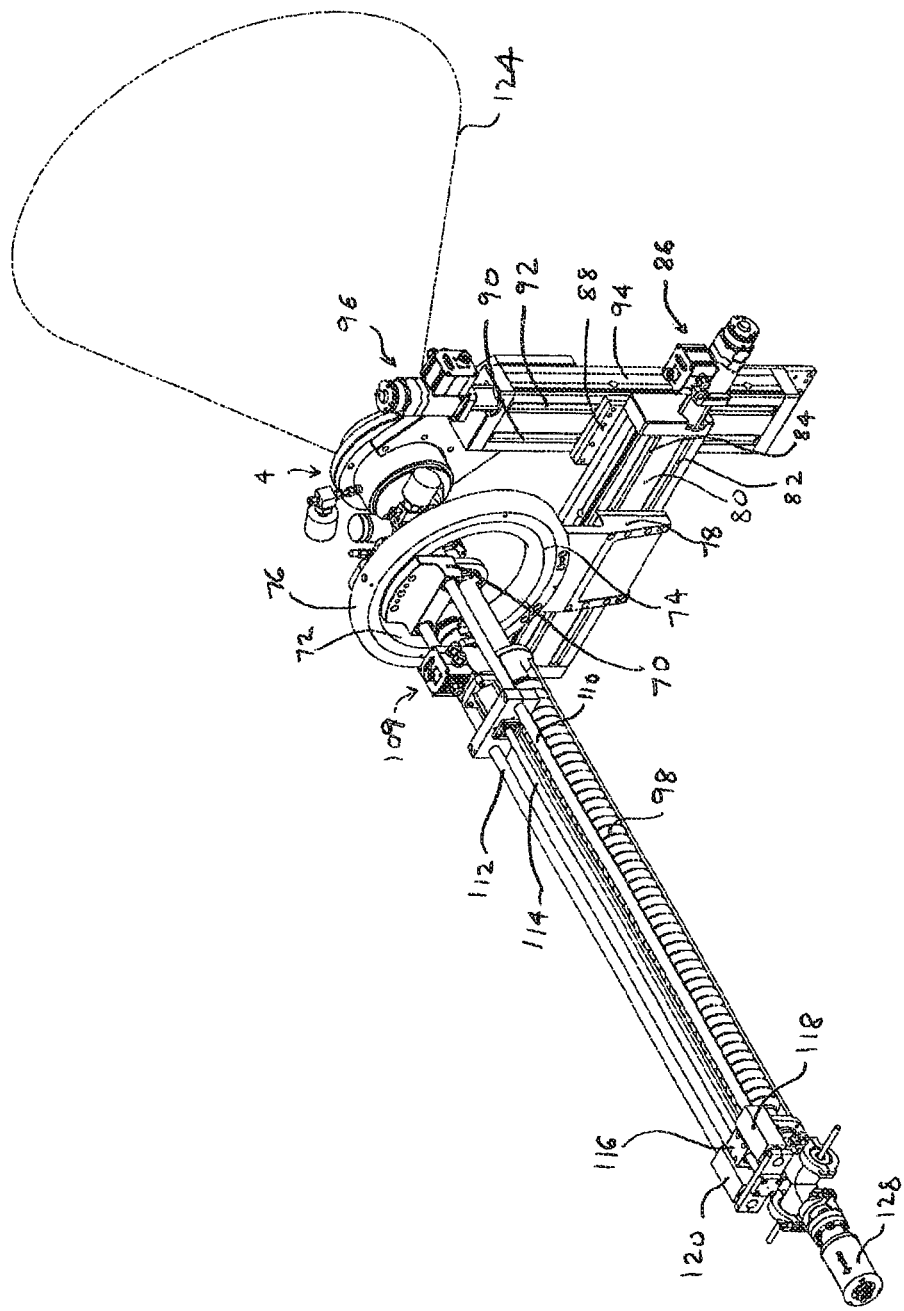
FIG. 3 is a perspective view, from a trailing end, of a manipulator assembly of FIG. 1, with the bellows extended.
Figure 4:
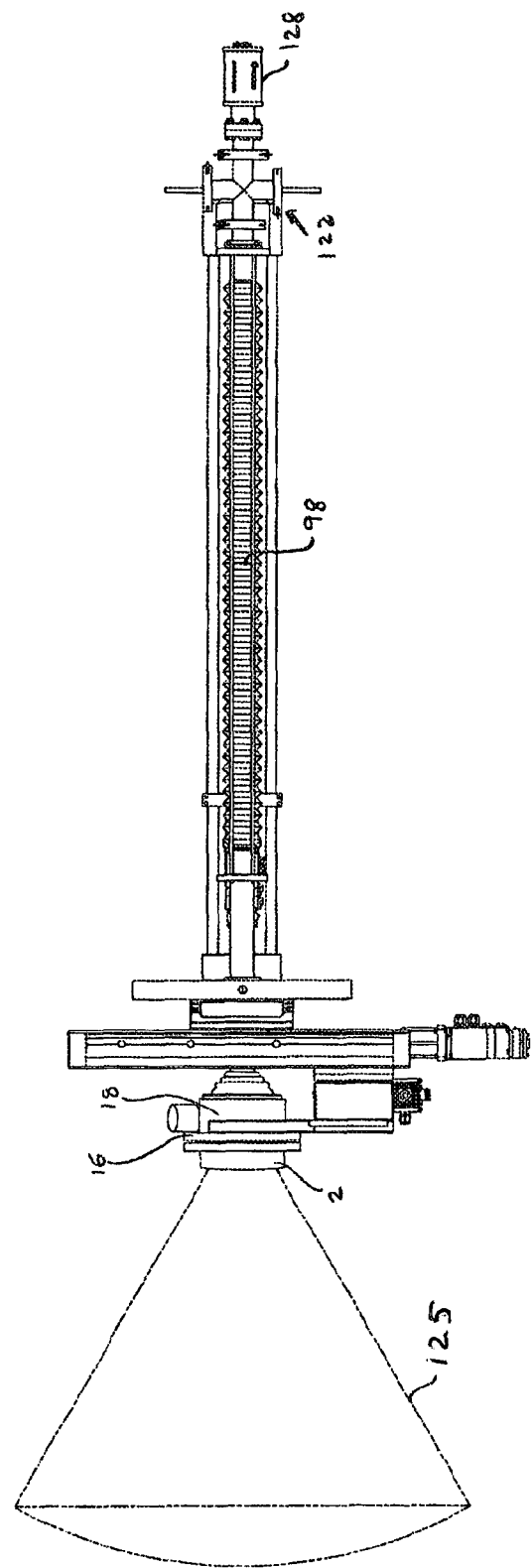
FIG. 4 is a bottom view of the manipulator assembly of FIG. 3.
Figure 5:
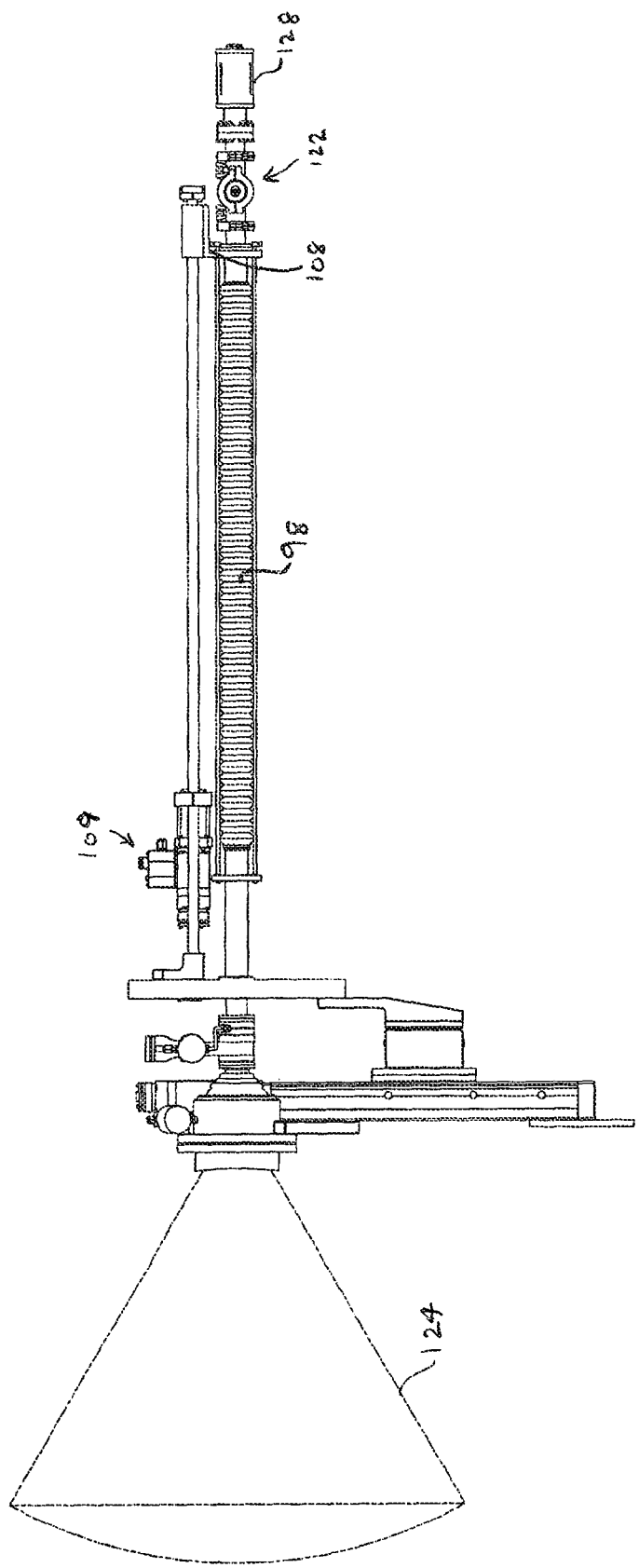
FIG. 5 is a side view of the manipulator assembly of FIG. 3 from the left side.
Figure 6:
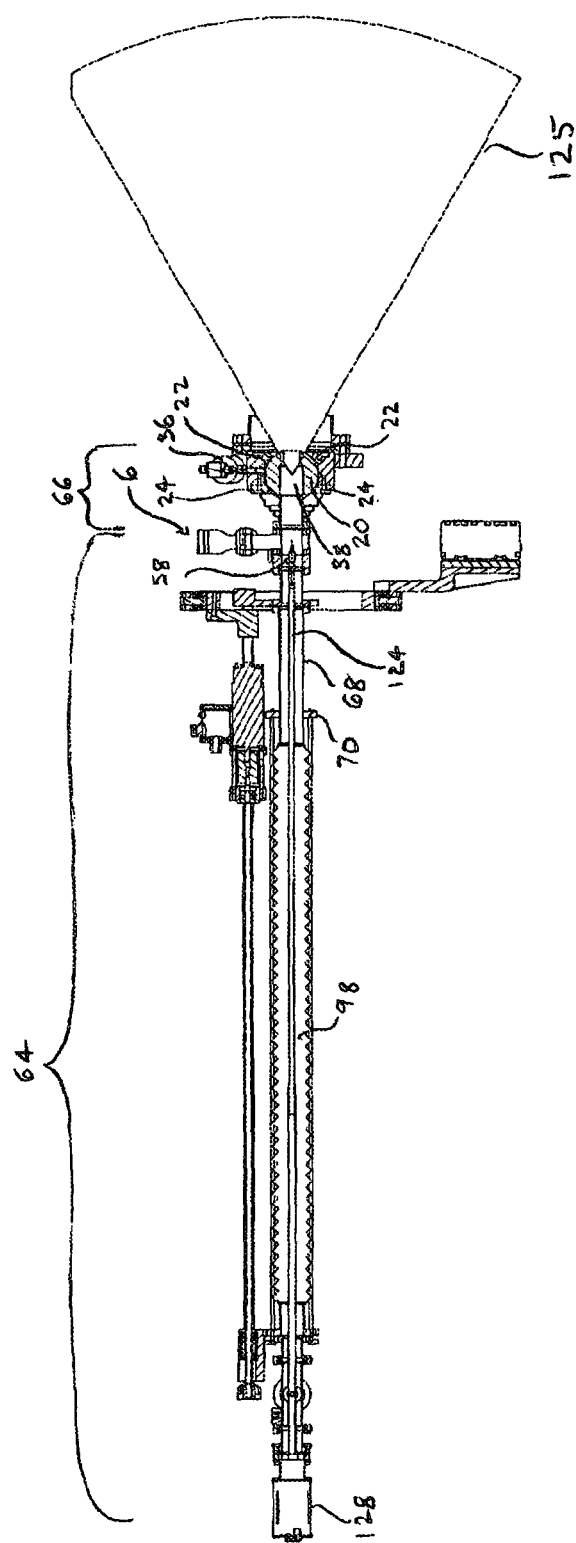
FIG. 6 is a side cross-section view of the manipulator assembly of FIG. 3.
Figure 7:
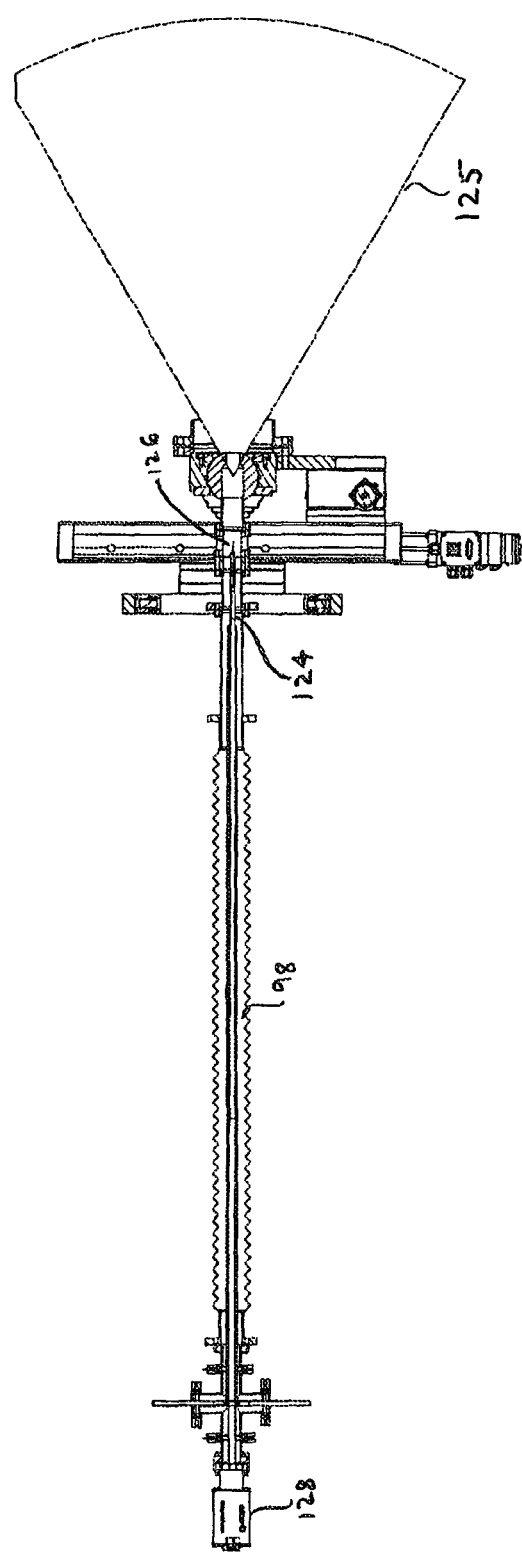
FIG. 7 is a top cross-section view of the manipulator assembly of FIG. 3.
Figure 8:
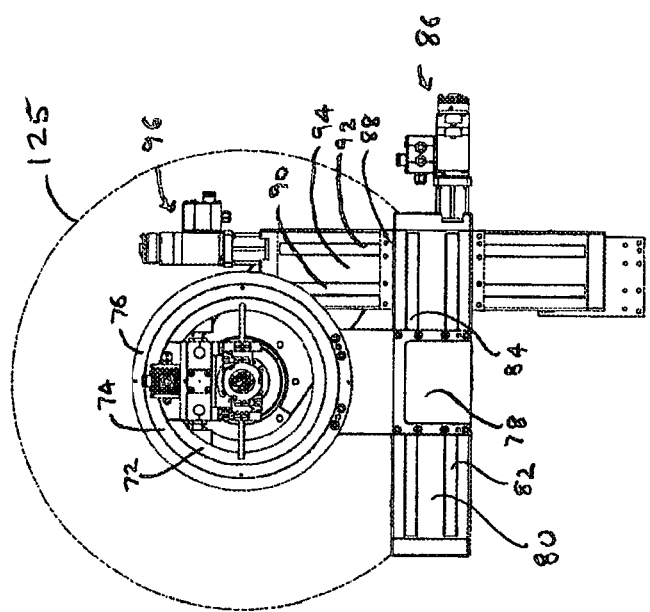
FIG. 8 is a rear view of the manipulator assembly of FIG. 1.
Figure 9:
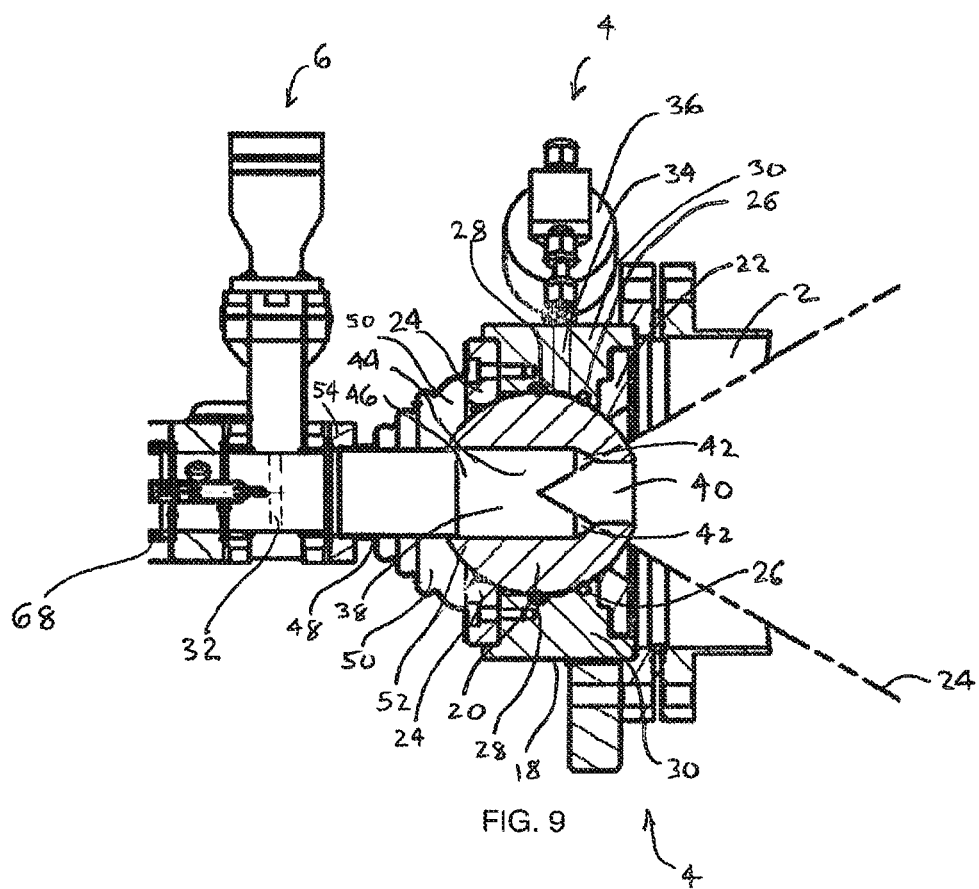
FIG. 9 is an enlarged cross-section view of the support housing and gate valve assembly sections shown in FIG. 6.

According to one aspect of the present disclosure there is provided a manipulator assembly for inserting an article such as an instrument into a controlled environment chamber, moving the article in the chamber and withdrawing the article from the chamber.

According to another aspect of the present disclosure, there is provided a movable manipulator assembly for manipulating an article in a controlled environment chamber, including a support for attaching the manipulator assembly in a gas tight manner to an entry port of a controlled environment chamber and externally with respect to the chamber, a ball joint including a central passage, sealingly seated in the support, for permitting three axis movement of the manipulator assembly while maintaining a gas seal, a manipulator arm extending from the ball joint externally with respect to the chamber, the arm including a central passage aligned with the central passage of the ball joint, the arm further including a closable entry port through which the central passage of the manipulator arm can be accessed, and a gimbaled bearing assembly connected to the manipulator arm for three axis movement of the arm. The movable manipulator assembly may further include a gimbaled bearing assembly comprising a first gimbal and a second gimbal, the first gimbal pivotally mounted within the inner diameter of the second gimbal, the second gimbal pivotally mounted within the inner diameter of an outer ring such that the second gimbal is pivotable about a second pivot axis, the first pivot axis is orthogonal to the second pivot axis, the outer ring is fixed to the manipulator arm. The movable manipulator assembly may further include a drive assembly attached to the first and second gimbals for pivoting the first and second gimbals to move the manipulator arm. The movable manipulator assembly may further include a gate valve in the central passage of the manipulator arm for opening and closing the central passage of the manipulator arm. In the movable manipulator assembly, the manipulator arm may further include a bellows section permitting the manipulator arm to be extended and retracted while remaining gas tight. The movable manipulator assembly may further include a rail attached to the manipulator arm, a carriage attached to the upstream end of the bellows and running along the rail such that movement of the carriage extends or retracts the bellows.

Referring to the drawings, a manipulator assembly according to an embodiment of the present invention is attachable to an entry port 2 in wall 3 of a controlled environment chamber (exemplary chamber shown in stippled lines). The manipulator assembly includes a support housing indicated generally by 4, a gate valve assembly indicated generally by 6, a gimbaled bearing assembly indicated generally by 8, a gimbal drive assembly indicated generally by 10, a bellows assembly indicated generally by 12, and a bellows drive assembly indicated generally by 14.

The support housing 4 includes a flanged connection 16 such as a Conflate vacuum flange for coupling the manipulator assembly to the entry port 2 to seal the port 2 in a gas-tight manner relative to the outside of the chamber. The support housing 4 further includes a cup 18 in which a ball joint 20 is seated. The ball joint 20 is supported and ringed by two bearings 22 and 24 which permit the ball joint 20 to rotate within the cup 18. Two o-rings 26 and 28 are provided in the wall 30 of the cup 18 for providing a gas-tight seal between the chamber and the section of the manipulator assembly upstream of a gate valve 32 in the gate valve assembly 6. A duct 34 is provided in the wall 30 of the cup 18. A valve assembly 36 is attached to the duct 34 and is connectable to a vacuum pump (not shown). A central passage 38 passes through the ball joint 20. At the leading end 40, the central passage has a first diameter. The passage 38 then flares, by way of a bevel 42 to a second wider diameter section 44 and passes through the ball joint 20 to a second side 46 of the ball joint 20 upstream of the leading end 40. A sleeve 48 is connected to the ball joint 20 at the second side 46 in a gas-tight manner. A rubber boot 50 covers encloses the sleeve 48 and the exposed section 52 of the ball joint 20 which projects from the cup 18, so that the ball joint 20 remains sealed against the exterior atmosphere as the ball joint 20 is rotated within the cup 18.

The gate valve assembly 6 is connected to the sleeve 48 at its upstream end 54 in a gas-tight manner. The gate valve assembly includes a central passage which is aligned with the central passage of the sleeve. The gate valve assembly includes 6 ports 56 and 58 which are connected to manual valves 60 and 62, respectively. When valve 60 is open, air outside the chamber can flow into the upstream section indicated generally by 64 of the manipulator assembly upstream of the gate valve 32. When valve 62 is open and port 58 is attached to a vacuum pump (not shown), the downstream section indicated generally by 66 of the manipulator assembly can be evacuated along with the chamber.

A sleeve 68 is connected in a gas-tight manner to the sleeve 48 with a KF style Conflat fitting. A mounting bracket 70 is attached to the sleeve 68. The mounting bracket 70 is attached to a first gimbal 72 of the gimbaled bearing assembly 8. The gimbal bearing assembly 8 further includes a second gimbal 74. The first gimbal 72 is pivotally mounted within the inner diameter of the second gimbal 74 by pins such that the first gimbal is pivotable about a first pivot axis defined by the pins. The second gimbal 74 is pivotally mounted within the inner diameter of an outer ring 76 by pins such that the second gimbal 74 is pivotable about a second pivot axis defined by the pins. The first pivot axis is orthogonal to the second pivot axis. The outer ring 76 is not pivotable.

The outer ring 76 is attached to a carriage 78 which is movable on a slide 80. The carriage 78 rides in longitudinal grooves 82 and 84 in the slide 80 for back and forth movement along the longitudinal axis of the slide 80. A servo motor drive assembly indicated generally by 86 drives a ball screw assembly (not shown) to drive the carriage 78. The slide 80 is attached to a carriage 88. The carriage 88 rides in longitudinal grooves 90 and 92 in the slide 94 for back and forth movement along the longitudinal axis of the slide 94. The longitudinal axis of the slide 94 is orthogonal to the longitudinal axis of the slide 80. A servo motor drive assembly indicated generally by 96 drives a ball screw assembly (not shown) to drive the carriage 88.

The sleeve 68 is connected to the bellows assembly 12. The bellows assembly 12 includes a collapsible bellows 98 whose downstream end is connected to the upstream end of the sleeve 68. A flange 100 is attached to the outside of the sleeve 68. Two rails 102 and 104 are attached to the flange 100 and extend along the longitudinal axis of the bellows 98. A sleeve 106 is connected to the upstream end of the bellows 98. An L-shaped bracket 108 is attached to the outside of the sleeve 106. The L-shaped bracket 108 rides along the rails 102 and 104.

The bellows drive assembly 14 includes a servo motor drive assembly indicated generally at 109 which is attached to the bracket 70. Rails 110 and 112 are attached to the bracket 70. The servo motor drive assembly 109 drives the screw 114 of the ball screw nut assembly 116. The carriages 118 and 120 of the ball screw nut assembly 116 ride the rails 110 and 112. The ball screw nut assembly 116 and carriages 118 and 120 are attached to the L-shaped bracket 108 such that when the L-shaped bracket 108 is driven on the rails 102 and 104, the bellows 98 is expanded or retracted.

A KF-style feed-through T-assembly indicated generally by 122 is connected to the upstream end of the sleeve 106 with KF-type fittings. In the illustrated embodiment, a Langmuir probe 124 is shown inserted in the manipulator assembly. The Langmuir probe 124 has a leading end 126 with instrumentation and a trailing end 128. The trailing end is connected with a KF-type fitting to the T-assembly 122. It will be understood by those of ordinary skill in the art that other articles such as fibre optic instruments, mass spectrometers, cameras and the like may be inserted into the manipulator assembly for insertion into the chamber. An article inserted into the chamber can be moved about in the chamber in an area defined by cone 125.

In operation, the manipulator assembly and in turn an article in the manipulator assembly can be tilted and rotated by activating one or both of the servo drive assemblies 86 and 96 to drive the carriages 78 and 88, respectively. Movement of the carriages 78 and 88 along the orthogonal axis of the slides 80 and 94 acts on the gimbals 72 and 74 tilt the manipulator assembly.

Actuation of the bellows drive assembly 14 causes the bellows 98 to be retracted or expanded and moves the Langmuir probe 124 or other article or instrument into and out of the chamber.

It will be understood by those of ordinary skill in the art that the manipulator assembly is not limited to the use of manual valves. Non-manual valves such as pneumatic or electronic valves or other suitable valves can be used in place of the manual valves referred to herein. It will be further understood that the manipulator assembly is not limited to the use of servo motors. Driving of the various components can be achieved manually, with stepper motors, pneumatic actuation and by way of other suitable drives. It will be further understood that the various valves and motors can be connected to a controlled by one or more controllers including electronic controllers (not shown) including a processor and memory. The one or more controllers can be programmed to control the various operations of the manipulator assembly.

What is claimed is:

1. A movable manipulator assembly for manipulating an article in a controlled environment chamber, comprising:
    a support for attaching the manipulator assembly in a gas tight manner to an entry port of a controlled environment chamber and externally with respect to the chamber,
    a ball joint including a central passage, sealingly seated in the support, for permitting three axis movement of the manipulator assembly while maintaining a gas seal,
    a sleeve extending from the ball joint externally with respect to the chamber, the sleeve including a central passage aligned with the central passage of the ball joint, the sleeve further including a closable entry port through which the central passage of the sleeve can be accessed, and
    a gimbaled bearing assembly connected to the sleeve for three axis movement of the sleeve.

2. The movable manipulator assembly of claim 1, the gimbaled bearing assembly comprising a first gimbal and a second gimbal, the first gimbal pivotally mounted within the inner diameter of the second gimbal, the second gimbal pivotally mounted within the inner diameter of an outer ring such that the second gimbal is pivotable about a second pivot axis, the first pivot axis is orthogonal to the second pivot axis, the outer ring is fixed to the sleeve.

3. The movable manipulator assembly of claim 2, further comprising a drive assembly attached to the first and second gimbals for pivoting the first and second gimbals to move the sleeve.

4. The movable manipulator assembly of claim 2, further comprising a gate valve in the central passage of the sleeve for opening and closing the central passage of the sleeve.

5. The movable manipulator assembly of claim 2, the sleeve further comprising a bellows permitting the sleeve to be extended and retracted while remaining gas tight.

6. The movable manipulator assembly of claim 5 further comprising a rail attached to the sleeve, a carriage attached to the upstream end of the bellows and running along the rail such that movement of the carriage extends or retracts the bellows.

7. The movable manipulator assembly of claim 6 further comprising a drive connected to the carriage for moving the carriage.

8. The movable manipulator assembly of claim 2, further comprising a cup in the support for seating the ball joint.

* * * * *